United States Patent Office 2,717,233
Patented Sept. 6, 1955

2,717,233

SEPARATION OF GAMMA BENZENE HEXA-CHLORIDE BY DISTILLATION

Percy W. Trotter, Baton Rouge, La., assignor to Ethyl Corporation, New York, N. Y., a corporation of Delaware No Drawing. Application October 30, 1952, Serial No. 317,825

2 Claims. (Cl. 202—57)

This invention relates to the treatment of benzene hexachloride (1,2,3,4,5,6-hexachlorocyclohexane) and more particularly to a method for the separation of the various isomers thereof.

It is known that benzene hexachloride (BHC) occurs in a number of isomeric forms. For example, in the addition chlorination of benzene, at least five such isomers are formed having approximately the following weight distribution: alpha, 65 per cent; beta, 8 per cent; gamma, 13 per cent; delta, 10 per cent; epsilon, less than 1 per cent; and the remainder, heptachlorocyclohexanes and other impurities. It is also known that the gamma isomer of BHC is by far the most insecticidally active isomer. Accordingly, it is frequently desired to concentrate isomer mixtures with respect to the gamma isomer to facilitate the preparation of improved insecticidal formulations by the elimination of the inert isomers and odoriferous constituents thereof. In addition, some of the other BHC isomers, such as the delta isomer, show promise for other and similar commercial purposes.

At the present time, the gamma isomer is recovered from technical or crude BHC isomer mixtures by extraction and fractional crystallization using selected solvents. While quite satisfactory for effecting separation of the relatively soluble gamma isomer from the relatively insoluble alpha isomer, such a procedure is difficult when attempting to separate the gamma isomer from the highly soluble delta isomer. In consequence, a large quantity (up to about 35 per cent of the gamma isomer) is frequently lost in a high delta isomer stream which cannot subsequently be used in the manufacture of lindane (above 99 per cent gamma BHC).

It is accordingly an object of this invention to provide an improved method for the treatment of BHC and more particularly for the separation of the various isomers thereof. Another object is to provide a method adapted to the separation of the gamma and delta BHC isomers, and particularly a method which can be employed to recover the gamma isomer from high delta isomer streams obtained in prior fractional extraction and crystallization processes.

It has now been found that the various benzene hexachloride isomers can be separated by distillation of BHC isomer mixtures with the aid of a selected group of solvents. Upon distillation, the various BHC isomers can be recovered as an overhead or bottoms in a plurality of fractions or cuts. According to this process, the gamma isomer is recovered in exceedingly high yields as an overhead fraction, whereas the delta isomer remains almost completely in the bottoms fraction. In addition, further separation of the gamma isomer from other isomers can be accomplished by recovering the overhead in a number of distinct cuts, some of which are richer in the gamma isomer than in other isomers.

In practice, the number of cuts are determined by the degree of isomer separation desired. If, for example, it is merely desired to separate the gamma and delta isomers, the entire overhead can be recovered as the high gamma fraction, and the bottoms recovered as the high delta fraction. However, if it is desired to separate the gamma, delta and alpha isomers, the latter isomer is recovered as the first (most volatile) overhead fraction, the gamma as the second overhead fraction, and the delta isomer is recovered either as a third overhead fraction or preferably as the bottoms of the distillation. More complete isomer separations can be accomplished by increasing the number of overhead cuts.

This process can be carried out continuously, if desired, by stripping off any desired fraction, such as by the use of a plurality of distillation columns. Thus, a two column system can be employed to remove a high alpha isomer and heptachloro cyclohexane mixture in the first column, and a high gamma isomer fraction in the second column. The bottoms from the second column, having a high delta isomer content, can then be recovered as such, or can be further distilled in a third column to additionally purify the stream.

The solvents useful with the present invention are of a polar nature and have a boiling point between about 280° and 300° C. Typical examples of such solvents are highly polar compounds having a plurality of hydroxyl groups, such as triethylene glycol (boiling point of 289° C.) and glycerine (boiling point of 291° C.).

The quantity of solvent employed per unit weight of BHC treated is not critical. However, the overhead of the distillation has a relatively definite proportion of BHC and solvent, and, accordingly, it is generally preferred to employ sufficient solvent to remove substantially all of the isomers it is desired to separate. Thus, in recovering the gamma isomer from delta isomer-containing BHC mixtures, the minimum quantity of solvent to be employed is that which will at least distill over as an overhead product substantially all of the gamma isomer. Additional quantities of solvent can be present in the mixture being distilled without adversely affecting the results of the separation, provided the high delta isomer fraction is recovered separately from the high gamma isomer fraction or fractions.

The temperature of the distillation is determined by the mixture being distilled, i. e., the boiling point of the solvent, the concentration and isomer distribution of the benzene hexachloride dissolved therein, and the positive pressure of the distillation system.

The distillation is preferably carried out at reduced pressure, generally below about 25 mm. and preferably below about 5 mm. absolute pressure. At such pressures, the distillation can be conducted at reduced temperatures and thereby minimize the possibility of cracking or dehydrochlorination of the BHC.

The number of plates used in the distillation column or columns is not critical to the successful operation of this process. In general, the greater the number of plates employed, the more complete the separation. Generally, between 5 and 15 plates has been found adequate for most separations. A reflux can also be employed to improve the separation of the isomers.

The following examples illustrate the features of the present invention:

EXAMPLE I

A benzene hexachloride mixture (100 parts by weight) containing 32 per cent gamma isomer, 12 per cent alpha isomer, 35 per cent delta isomer, and the remainder, a mixture of beta and epsilon isomers containing some heptachlorocyclohexane was distilled with 750 parts by weight of triethylene glycol. The overhead temperature of the distillation covered a range of between 105° and 152° C. Most of the BHC distilled over at a temperature between 130° and 150° C. The pressure of the distillation was maintained at about 5 mm. absolute pressure. The isomer distribution in the various cuts are given in Table I.

Table I.—(Weight per cent)

| Cut No. | BHC | | | | Hepta-chloro-cyclo-hexane |
|---|---|---|---|---|---|
| | Alpha | Delta | Epsilon | Gamma | |
| 1 | 31.6 | 4.1 | 13.5 | 6.9 | 43.9 |
| 2 | 34.8 | 0.4 | 4.7 | 26.3 | 33.8 |
| 3 | 16.3 | | 2.3 | 58.0 | 23.4 |
| 4 | 0.6 | 0.2 | 2.9 | 78.4 | 17.9 |
| 5 | | 10.1 | 6.6 | 66.4 | 16.9 |
| 6 | | 24.8 | 14.1 | 32.7 | 28.4 |

In this test, 88 per cent of the original gamma isomer was obtained as a 53 per cent gamma isomer product. At the same time, only about 3 per cent of the original quantity of delta isomer was obtained in the overhead fraction, and the final product merely contained about 2 per cent delta isomer.

EXAMPLE II

Example I was repeated except that the overhead fraction was separated into 7 cuts. The composition of the various cuts is given in Table No. II.

Table II.—(Weight per cent)

| Cut No. | BHC | | | | Hepta-chloro-cyclo-hexane |
|---|---|---|---|---|---|
| | Alpha | Delta | Epsilon | Gamma | |
| 1 | 34.0 | 1.9 | 9.6 | 12.2 | 42.3 |
| 2 | 27.4 | 3.4 | 5.2 | 31.7 | 32.3 |
| 3 | 18.6 | 5.0 | 4.5 | 47.4 | 24.5 |
| 4 | 0.8 | 0.7 | 2.0 | 91.9 | 5.6 |
| 5 | | 7.0 | 3.0 | 90.0 | |
| 6 | | 10.1 | 13.0 | 57.6 | 19.3 |
| 7 | 0.2 | 65.1 | 9.5 | 4.0 | 21.2 |

In considering only cuts 2–6 inclusive, 92 per cent of the original gamma isomer was recovered as a 61 per cent gamma isomer product. At the same time, only 5 per cent of the original delta isomer was obtained in these cuts and the product only contained 4 per cent delta isomer.

EXAMPLE III

Example I is repeated except that glycerine is substituted for triethylene glycol. The overhead product obtained from this distillation contains a BHC isomer distribution similar to that of Example I. However, using glycerine, somewhat greater ratios of BHC:solvent were obtained than when using triethylene glycol.

EXAMPLE IV

Example II is repeated except that glycerine is substituted for triethylene glycol as the solvent. Similar results are obtained.

As is believed apparent from the foregoing, the present invention provides an improved method for the separation of BHC isomers, and particularly for the separation of the difficultly separable gamma and delta isomers. This invention thus provides a convenient and effective means for separating a wide variety of BHC isomer mixtures, and one which is particularly adapted to the recovery of the gamma isomer from the high delta streams obtained in prior fractional extraction and crystallization methods.

I claim:

1. A method for treating benzene hexachloride isomer mixtures comprising distilling the isomer mixture in the presence of a polar solvent selected from the group consisting of triethylene glycol and glycerine, and recovering the benzene hexachloride in a plurality of fractions from said distillation.

2. A method for treating benzene hexachloride isomer mixture containing the gamma and delta isomers comprising distilling the isomer mixture in the presence of a polar solvent selected from the group consisting of triethylene glycol and glycerine until a major portion of the gamma isomer is distilled from the mixture and interrupting said distillation while a major portion of the delta isomer still remains undistilled, and recovering the gamma isomer fraction separate from the delta isomer fraction.

No references cited.